(12) United States Patent
De Angelis et al.

(10) Patent No.: US 12,709,564 B2
(45) Date of Patent: Aug. 18, 2026

(54) GLASS MANUFACTURING APPARATUS COMPRISING A DELIVERY CONDUIT SYSTEM WITH A LOW IMPEDANCE DRAIN ASSEMBLY

(71) Applicant: CORNING INCORPORATED, Corning, NY (US)

(72) Inventors: Gilbert De Angelis, Lindley, NY (US); Juan Camilo Isaza, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 142 days.

(21) Appl. No.: 18/710,342

(22) PCT Filed: Nov. 9, 2022

(86) PCT No.: PCT/US2022/049342
§ 371 (c)(1),
(2) Date: May 15, 2024

(87) PCT Pub. No.: WO2023/096746
PCT Pub. Date: Jun. 1, 2023

(65) Prior Publication Data

US 2025/0002389 A1 Jan. 2, 2025

Related U.S. Application Data

(60) Provisional application No. 63/282,478, filed on Nov. 23, 2021.

(51) Int. Cl.
*C03B 5/167* (2006.01)
*C03B 5/26* (2006.01)
(Continued)

(52) U.S. Cl.
CPC ............ *C03B 5/1675* (2013.01); *C03B 5/262* (2013.01); *C03B 7/07* (2013.01); *C03B 7/084* (2013.01)

(58) Field of Classification Search
None
See application file for complete search history.

(56) References Cited

U.S. PATENT DOCUMENTS 2,050,211 A 8/1936 Honiss
4,460,398 A 7/1984 Sasaki
(Continued)

FOREIGN PATENT DOCUMENTS

CN 102471115 A 5/2012
CN 102583957 B 7/2014
(Continued)

OTHER PUBLICATIONS

JP2019536724 machine translation, Chihiro et al., Glass Manufacturing Apparatus, Dec. 2019 (Year: 2019).*
(Continued)

*Primary Examiner* — Queenie S Dehghan
(74) *Attorney, Agent, or Firm* — Kevin M. Able; F. Brock Riggs

(57) ABSTRACT

A delivery conduit system for a glass manufacturing apparatus, the conduit system including a drain assembly configured to allow draining molten glass from the delivery conduit system. The drain assembly includes heating means and cooling means that can open a drain flow of molten glass from components of the conduit system and shut off flow to the forming body by selectively modifying the fluid impedance presented to the molten glass by the drain assembly.

16 Claims, 7 Drawing Sheets

(51) Int. Cl.
*C03B 7/07* (2006.01)
*C03B 7/084* (2006.01)

(56) References Cited

U.S. PATENT DOCUMENTS

| | | | | |
|---|---|---|---|---|
| 2009/0013725 | A1* | 1/2009 | Kano | C03B 17/064 65/99.1 |
| 2011/0203321 | A1 | 8/2011 | De et al. | |
| 2012/0125051 | A1 | 5/2012 | Bergman et al. | |
| 2021/0300807 | A1 | 9/2021 | Amosov et al. | |
| 2021/0300808 | A1 | 9/2021 | Amosov et al. | |
| 2022/0081340 | A1 | 3/2022 | Amosov et al. | |
| 2022/0098080 | A1* | 3/2022 | Weil | B65G 47/908 |

FOREIGN PATENT DOCUMENTS

| | | | |
|---|---|---|---|
| CN | 105731765 | A | 7/2016 |
| CN | 213680363 | U | 7/2021 |
| DE | 248573 | A1 | 8/1987 |
| JP | 08-059248 | A | 3/1996 |
| JP | 2003-073130 | A | 3/2003 |
| WO | 2018/226535 | A1 | 12/2018 |

OTHER PUBLICATIONS

International Search Report and Written Opinion of the International Searching Authority; PCT/US2022/049342; mailed on Mar. 31, 2023, 14 pages; Korean Patent Office.

* cited by examiner

GLASS MANUFACTURING APPARATUS COMPRISING A DELIVERY CONDUIT SYSTEM WITH A LOW IMPEDANCE DRAIN ASSEMBLY

CROSS-REFERENCE TO RELATED APPLICATIONS

This is a national stage application under 35 U.S.C. § 371 of International Application No. PCT/US2022/049342, filed on Nov. 9, 2022, which claims the benefit of priority under 35 U.S.C. § 119 of U.S. Provisional Application Ser. No. 63/282,478 filed on Nov. 23, 2021, which is incorporated herein by reference in their entireties.

FIELD

The present disclosure relates to a glass manufacturing apparatus, and in particular a glass manufacturing apparatus including a drain capable of ceasing flow of molten material to a forming apparatus during the draining.

BACKGROUND

Glass manufacturing processes can be divided into three stages: melting, conditioning and forming. Precursor materials are heated to form a molten material, bubble-forming gases are removed from the molten material, and the molten material is homogenized, for example by stirring. The molten material is then provided to a forming apparatus that forms the molten material into a useful product. Normally, after conditioning and before the forming apparatus, a drain in the glass manufacturing apparatus may be used to drain molten material from the system in the event of a problem with the forming apparatus or forming process, a problem with the molten material itself, or to change the composition of the molten material in the system.

However, drains may not by themselves redirect all of the flow of molten material from the system, and particularly the forming apparatus. As the molten material empties from the system, the molten material may flow to both the forming apparatus and the drain. This can be problematic because the forming system may be damaged by unintended flow of molten material through the forming apparatus during the draining process.

SUMMARY

In a first aspect, a glass manufacturing apparatus is disclosed comprising a delivery conduit system configured to convey a flow of molten glass from a delivery vessel to a forming body, the delivery conduit system comprising: an exit conduit extending from the delivery vessel, an inlet conduit extending from the forming body, a drain assembly coupled between the exit conduit and the inlet conduit, the drain assembly comprising a downward-extending drain tube comprising an inlet end and an outlet end, a first cooling device disposed adjacent the delivery conduit system between the drain tube and the forming body, and a heating device configured to heat the outlet end of the drain tube.

In a second aspect, the heating device of the first aspect may comprise a pair of electrical flanges attached to the drain tube.

In a third aspect, the drain assembly of any one of the first or second aspect may comprise a first curved conduit section configured to direct the flow of molten glass from a first direction to a second direction different from the first direction.

In a fourth aspect, the first curved conduit section of any one of the first through the third aspects may comprise a first curved conduit portion and a second curved conduit portion, each of the first curved conduit portion and the second curved conduit portion configured to direct the flow of molten glass through a change in direction of 90 degrees.

In a fifth aspect, the first curved conduit section of the fourth aspect comprises a first straight conduit portion coupled between the first curved conduit portion and the second curved conduit portion.

In a sixth aspect, the drain tube of the fifth aspect may be coupled to the first straight conduit portion.

In a seventh aspect, the glass manufacturing apparatus of the fifth aspect may further comprise a second curved conduit section coupled to the first curved conduit section.

In an eighth aspect, the glass manufacturing apparatus of the seventh aspect may comprise a second straight conduit portion coupled between the second curved conduit portion and the second curved conduit section.

In a ninth aspect, the cooling device of the eighth aspect may be positioned proximate the second straight conduit portion.

In a tenth aspect, the delivery conduit system of any one of the first through the ninth aspects may comprise platinum.

In an eleventh aspect, an inside diameter of the exit conduit of the third aspect may be less than an inside diameter of the first curved conduit section.

In a twelfth aspect, a first transition tube may be coupled between the exit conduit and the first curved conduit section of the eleventh aspect, and an inside diameter of the first transition tube may vary between the inside diameter of the exit conduit and the inside diameter of the first curved conduit section.

In a thirteenth aspect, an inside diameter of the inlet conduit of the third aspect may be less than an inside diameter of the first curved conduit section.

In a fourteenth aspect, a first transition tube may be coupled between the inlet conduit and the first curved conduit section of the eleventh aspect, and an inside diameter of the first transition tube may vary between the inside diameter of the inlet conduit and the inside diameter of the first curved conduit section.

In a fifteenth aspect, the second curved conduit section of the seventh aspect may be coupled to the inlet conduit and an inside diameter of the inlet conduit may be less than an inside diameter of the second curved conduit section.

In a sixteenth aspect, a second transition tube may be coupled between the inlet conduit and the second curved conduit section of the eleventh aspect, and an inside diameter of the second transition tube may vary between the inside diameter of the inlet conduit and the inside diameter of the second curved conduit section.

In a seventeenth aspect, the glass manufacturing apparatus of any one of the first aspect through the sixteenth aspect may further comprise a second cooling device positioned proximate the exit conduit.

In an eighteenth aspect, a glass manufacturing apparatus is described, comprising a delivery vessel, a forming body, and a delivery conduit system configured to convey a flow of molten glass from the delivery vessel toward the forming body, the delivery conduit system comprising: an exit conduit extending downward from the delivery vessel; an inlet conduit extending from the forming body; a drain assembly coupled between the exit conduit and the inlet conduit, the drain assembly comprising a first curved conduit section and a second curved conduit section disposed downstream of the first curved conduit section relative to a flow direction of the molten glass; a drain tube extending downward from the drain assembly, the drain tube comprising a proximal end attached to the drain assembly and a distal end opposite the proximal end; a first cooling device disposed downstream from the first curved conduit section and configured to cool the at least a portion of the delivery conduit system downstream from the first curved conduit section; and a heating device configured to heat the distal end of the drain tube.

In a nineteenth aspect, an inside diameter of the exit conduit may be less than an inside diameter of the first curved conduit section.

In a twentieth aspect, an inside diameter of the inlet conduit may be less than an inside diameter of the second curved conduit section.

In a twenty-first aspect, the first curved conduit section of any one of the eighteenth aspect through the twentieth aspects may be configured to direct the flow of molten glass from a first direction to a second direction opposite the first direction.

In a twenty-second aspect, the second curved conduit section of the twenty-first aspect may be configured to direct the flow of molten glass from the second direction to a third direction intermediate the first direction and the second direction.

In a twenty-third aspect, the third direction may be orthogonal to the first direction.

In a twenty-fourth aspect, the first curved conduit section of the twenty-first aspect may comprise a first curved conduit portion and a second curved conduit portion, each of the first curved conduit portion and the second curved conduit portion extending through an angle of 90 degrees.

In a twenty-fifth aspect, the first curved conduit section of any one of the eighteenth aspect through the twenty-fourth aspect may comprise a first curved conduit portion, a second curved conduit portion, and a first straight conduit portion disposed between the first curved conduit portion and the second curved conduit portion.

In a twenty-sixth aspect, the proximal end of the drain tube may be attached to and in fluid communication with the straight section.

In a twenty-seventh aspect, the glass manufacturing apparatus of any one of the eighteenth aspect through the twenty-second sixth aspect may further comprise a second cooling device positioned proximate to and configured to cool the exit conduit.

In a twenty-eighth aspect, the glass manufacturing apparatus of any one of the eighteenth aspect through the twenty-seventh aspect may further comprise a second straight conduit portion coupled between the first curved conduit section and the second curved conduit section.

In a twenty-ninth aspect, a method of draining a delivery conduit system is disclosed, comprising: flowing molten glass from a delivery vessel to a forming body through a delivery conduit system comprising an exit conduit connected to the delivery vessel, an inlet conduit connected to the forming body, and a drain assembly connected between the exit conduit and the inlet conduit, the drain assembly comprising a drain tube connected thereto, the drain tube comprising a proximal end attached to the drain assembly and a distal end opposite the proximal end, the drain tube comprising a first plug of material disposed therein that prevents a flow of the molten glass from the distal end; heating the distal end of the drain tube to remove the plug of material and allow the molten glass to flow from the distal end; and cooling the molten glass in a portion of the delivery conduit system downstream from the drain tube to form a second plug of material in the delivery conduit system and reduce the flow of molten glass to the forming body.

In a thirtieth aspect, the method may further comprise cooling the molten glass in at least a portion of the exit conduit with a second cooling device.

Both the foregoing general description and the following detailed description are intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
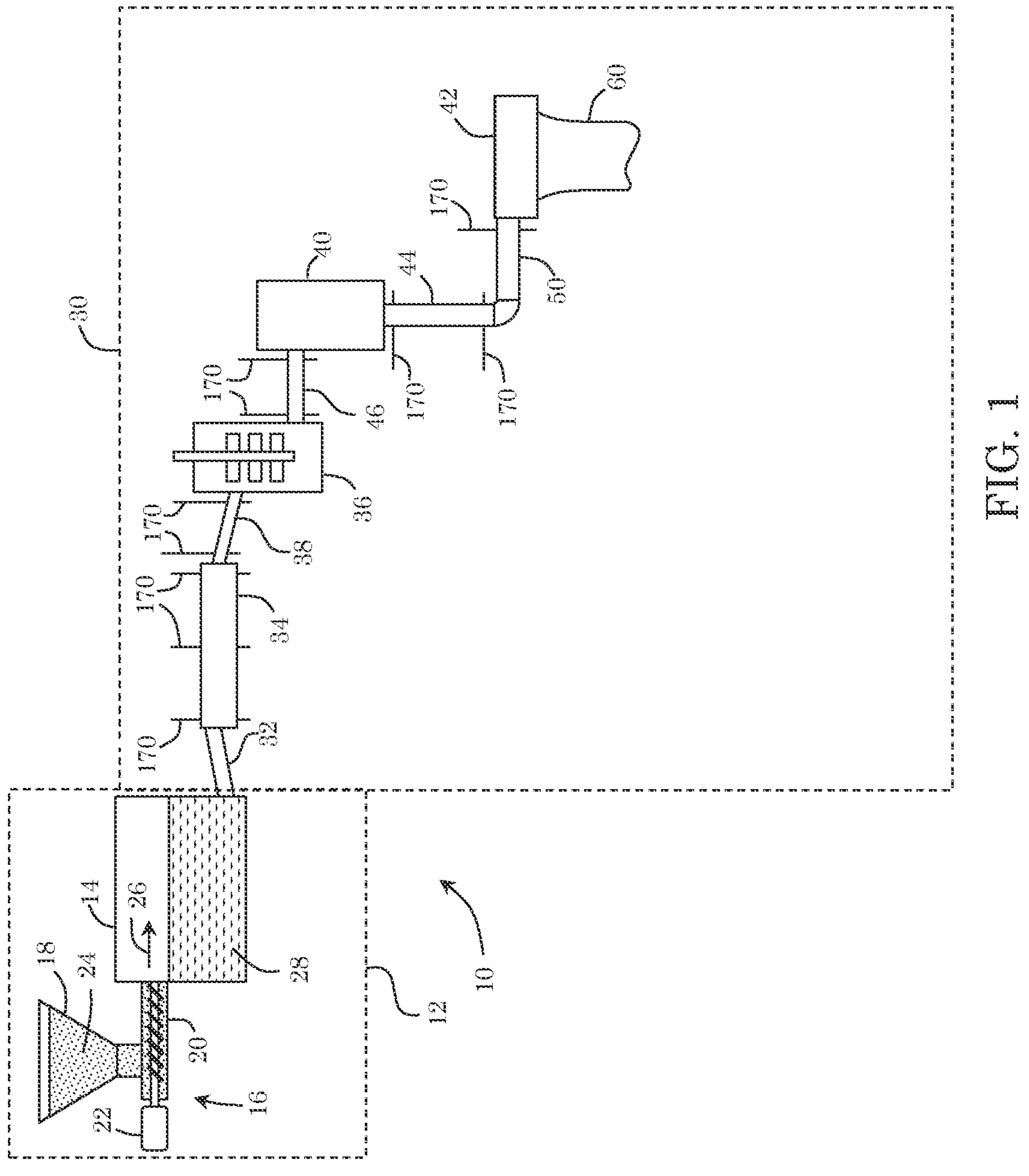
FIG. 1 is a schematic view of an exemplary glass manufacturing apparatus.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example, up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could be presented but have been omitted for brevity.

As used herein, the terms "comprising" and "including," and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Shown in FIG. 1 is an exemplary glass manufacturing apparatus 10. Glass manufacturing apparatus 10 comprises a glass melting furnace 12 including a melting vessel 14. In addition to melting vessel 14, glass melting furnace 12 may optionally include one or more additional components such as heating elements (e.g., combustion burners and/or electrodes) configured to heat raw material and convert the raw material into a molten material, which, when cooled, is capable of forming a glass article. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material. The molten material will hereinafter be referred to as molten glass. The glass article may, for example, be a silicate glass article and comprise a borosilicate glass, an aluminoborosilicate glass, an alkali-free aluminoborosilicate glass, or a soda-lime glass.

Glass melting furnace 12 may include other thermal management devices (e.g., thermal insulation components) that reduce heat loss from the melting vessel. Glass melting furnace 12 may include mechanical, electronic, and/or electromechanical devices that facilitate melting of the raw material into a glass melt. Glass melting furnace 12 may include support structures (e.g., support chassis, support member, etc.) or other components.

Melting vessel 14 can be formed from a refractory material, for example a refractory ceramic material comprising alumina or zirconia, although the refractory ceramic material can comprise other refractory materials, such as yttrium (e.g., yttria, yttria-stabilized zirconia, yttrium phosphate), zircon ($ZrSiO_4$) or alumina-zirconia-silica or even chrome oxide, used either alternatively or in any combination. In some examples, melting vessel 14 may be constructed from refractory ceramic bricks.

As used herein a refractory material is a non-metallic inorganic material that is polycrystalline, polyphasic, inorganic, porous, heterogeneous, and suitable as a component of an apparatus or system exposed to temperatures in excess of 538° C. For example, refractory materials may include but are not limited to oxides of aluminum, silicon, magnesium, calcium, yttrium, and zirconium, alone or in combination. Refractory materials may include a binder material.

Glass melting furnace 12 may be incorporated as a component of a glass manufacturing apparatus configured to fabricate a glass article, for example a glass ribbon, although the glass manufacturing apparatus can be configured to form other glass articles without limitation, such as glass rods, glass tubes, glass envelopes (for example, glass envelopes for lighting devices, e.g., light bulbs), and glass lenses. In some examples, glass melting furnace 12 may be included in a glass manufacturing apparatus comprising a slot draw apparatus, a float bath apparatus, a down-draw apparatus (e.g., a fusion down-draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a slot draw glass manufacturing apparatus 10. A slot draw process operates by supply molten glass to a forming body comprising a slot in a bottom of the forming body. Molten glass flows from the slot and may be drawn downward therefrom via gravity and counterrotating pulling rolls positioned beneath the slot. The glass ribbon thus formed may subsequently be processed into individual glass sheets or rolled as a glass ribbon onto a spool.

Glass manufacturing apparatus 10 may optionally include an upstream glass manufacturing apparatus 16 positioned upstream of melting vessel 14. In some examples, a portion of, or the entire upstream glass manufacturing apparatus 16, can be incorporated as part of the glass melting furnace 12.

As shown in FIG. 1, upstream glass manufacturing apparatus 16 can include a raw material storage bin 18, a raw material delivery device 20, and a motor 22 connected to raw material delivery device 20. Raw material storage bin 18 can be configured to store raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 may be powered by motor 22 to deliver a predetermined amount of raw material 24 from raw material storage bin 18 to melting vessel 14. In further examples, motor 22 may power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, the raw material is added to the melting vessel as particulate, for example as various "sands." Raw material 24 may also include scrap glass (i.e., cullet) from previous melting and/or forming operations. Combustion burners may be used to begin the melting process. In an electrically boosted melting process, once the electrical resistance of the raw material is sufficiently reduced by the combustion burners, electric boost can begin by developing an electrical potential between electrodes positioned in contact with the raw material, thereby establishing an electrical current through the raw material, the raw material typically entering, or in, a molten state.

Glass manufacturing apparatus 10 may also include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. For instance, first connecting conduit 32 discussed below, or other portions of the downstream glass manufacturing apparatus 30, may be incorporated as part of the glass melting furnace 12.

Downstream glass manufacturing apparatus 30 may include a first conditioning chamber, such as fining vessel 34, located downstream from melting vessel 14 and coupled to melting vessel 14 by way of the above-referenced first connecting conduit 32. Molten glass 28 may be gravity fed from melting vessel 14 to fining vessel 34 by way of first connecting conduit 32. Accordingly, first connecting conduit 32 provides a flow path for molten glass 28 from melting vessel 14 to fining vessel 34. However, other conditioning chambers may be positioned downstream of melting vessel 14, for example between melting vessel 14 and fining vessel 34. In some embodiments, a conditioning chamber may be employed between the melting vessel and the fining chamber. For example, molten glass from a primary melting vessel can be further heated in a secondary melting (conditioning) vessel or cooled in the secondary melting vessel to a temperature lower than the temperature of the molten glass in the primary melting vessel before entering the fining chamber.

Bubbles may be removed from molten glass 28 by various techniques. For example, raw material 24 may include multivalent compounds (i.e., fining agents) such as tin oxide that, when heated, undergo a chemical reduction reaction and release oxygen. Other suitable fining agents can include without limitation arsenic, antimony, iron, and/or cerium, although the use of arsenic and antimony, owing to their toxicity, may be discouraged for environmental reasons in some applications. Fining vessel 34 is heated, for example to a temperature greater than the melting vessel interior temperature, thereby heating the fining agent to a reaction temperature sufficient to induce chemical reduction of the one or more fining agents. Oxygen produced by chemical reduction of the one or more fining agents included in the molten glass diffuses into gas bubbles produced during the melting process. The enlarged gas bubbles with increased buoyancy rise to a free surface of the molten glass within the fining vessel and are thereafter vented from the fining vessel, for example through a vent tube in fluid communication with the atmosphere above the free surface.

Downstream glass manufacturing apparatus 30 may further include another conditioning chamber, such as mixing apparatus 36, for example a stirring vessel, for mixing the molten glass that flows downstream from fining vessel 34. Mixing apparatus 36 can be used to provide a homogenous glass melt composition, thereby reducing chemical and/or thermal inhomogeneities that may otherwise exist within the molten glass exiting the fining vessel. As shown, fining vessel 34 may be coupled to mixing apparatus 36 by way of a second connecting conduit 38. Accordingly, molten glass 28 can be gravity fed from the fining vessel 34 to mixing apparatus 36 through second connecting conduit 38. Typically, the molten glass within mixing apparatus 36 includes a free surface, with a free (e.g., gaseous) volume extending between the free surface and a top of the mixing apparatus. While mixing apparatus 36 is shown downstream of fining vessel 34 relative to a flow direction of molten glass 28, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. When used, multiple mixing apparatus may be of the same design, or they may be of a different design from one another. One or more of the vessels and/or conduits may include static mixing vanes positioned therein to further promote mixing and subsequent homogenization of the molten material.

Downstream glass manufacturing apparatus 30 may further include another conditioning chamber such as delivery vessel 40 located downstream from mixing apparatus 36. Delivery vessel 40 can act as an accumulator and/or flow controller to provide a consistent flow of molten glass 28 to forming body 42 by way of exit conduit 44. The molten glass within delivery vessel 40 can, in some embodiments, include a free surface, wherein a free volume extends upward from the free surface to a top of the delivery vessel. As shown, mixing apparatus 36 can be coupled to delivery vessel 40 by way of third connecting conduit 46, wherein molten glass 28 can be gravity fed from mixing apparatus 36 to delivery vessel 40 through third connecting conduit 46.

Downstream glass manufacturing apparatus 30 may further include forming apparatus 48 configured to form a glass article, for example glass ribbons. Accordingly, forming apparatus 48 may comprise a forming body 42, for example a forming vessel, wherein exit conduit 44 is positioned to deliver molten glass 28 from delivery vessel 40 to inlet conduit 50 of the forming vessel. The forming vessel may comprises a slot at the bottom of the forming vessel, wherein molten glass delivered to an open volume of forming vessel 42 flows through the slot to produce a ribbon 60 of molten glass that is drawn in draw direction 56 from the bottom edge by applying a downward tension to the glass ribbon, such as by gravity and/or and opposing, counter-rotating pulling rolls. Alternatively, forming body 42 may comprise, for example, a fusion down-draw glass manufacturing apparatus molten glass delivered to a trough in forming body 42 via delivery vessel 40, exit conduit 44 and inlet conduit 50. The molten glass overflows the walls of the trough and descends along the converging forming surfaces as separate flows of molten glass. The separate flows of molten glass join below and along a bottom edge of the forming body to produce the ribbon 60 of molten glass that is drawn in draw direction 56 from the bottom edge by, again, applying a downward tension to the glass ribbon, such as by gravity and/or counter-rotating and opposing pulling rolls. In either case, glass ribbon 60 goes through a viscosity transition, from a viscous state, to viscoelastic state, to an elastic state and acquires mechanical properties that give glass ribbon 60 stable dimensional characteristics. Glass ribbon 60 may be separated into shorter lengths, such as into glass sheets 62, by a glass separating apparatus 64. Alternatively, the glass ribbon may be spooled.

Components of downstream glass manufacturing apparatus 30, including any one or more of connecting conduits 32, 38, 46, fining vessel 34, mixing apparatus 36, delivery vessel 40, exit conduit 44, or inlet conduit 50 may be formed from a high-temperature metal. Suitable metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium.

Figure 2:
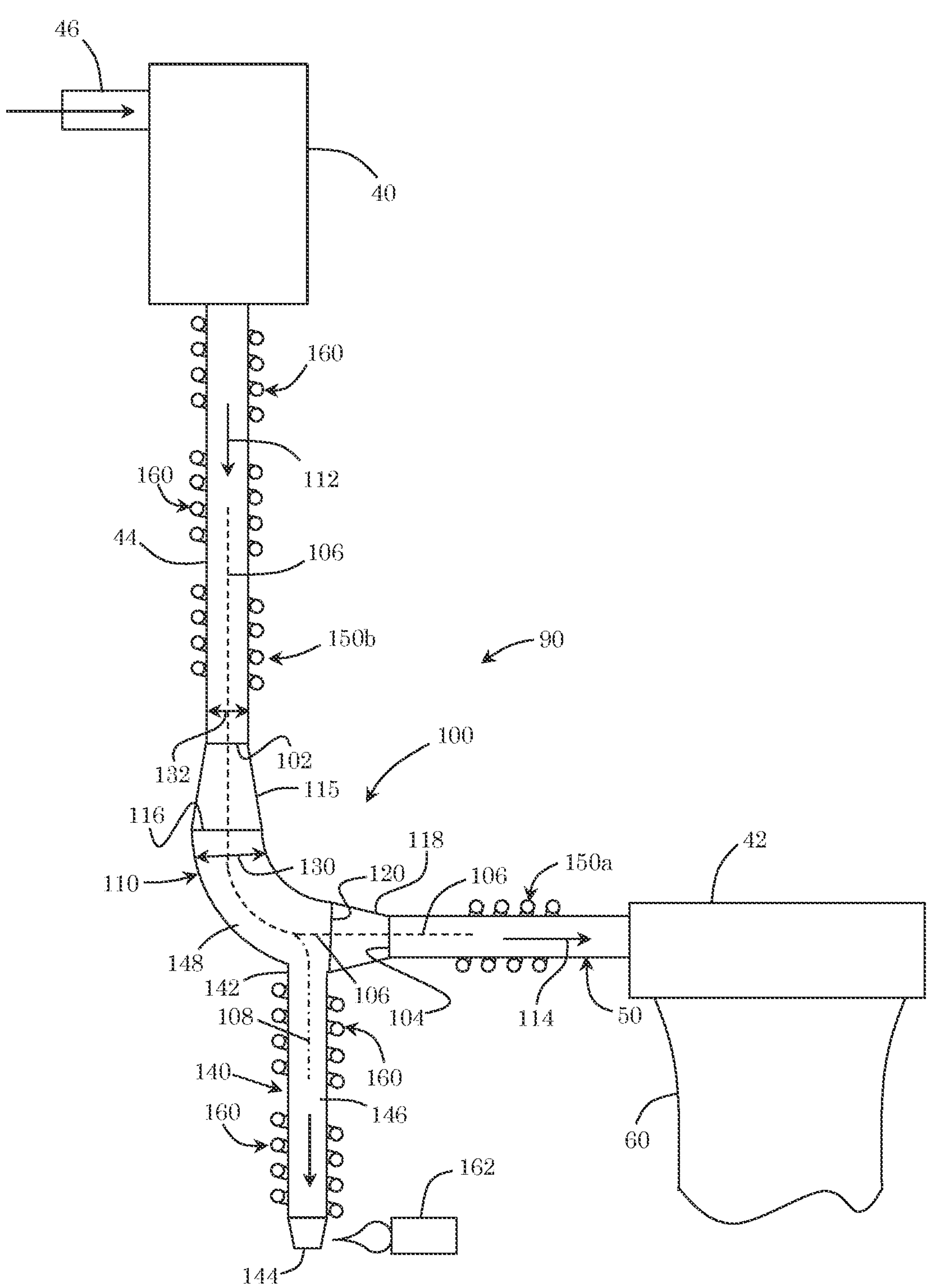
FIG. 2 is a cross-sectional view of a portion of the glass manufacturing apparatus of FIG. 1 comprising a delivery conduit system with a drain assembly configured to drain molten glass from the forming apparatus and adjacent components, the drain assembly using radiant heaters to heat the molten glass therein.

FIG. 2 is a cross-sectional view of a portion of downstream glass manufacturing apparatus 30, i.e., delivery conduit system 90, comprising exit conduit 44, inlet conduit 50, and drain assembly 100, delivery conduit system 90 configured to deliver molten glass from delivery vessel 40 to forming body 42. Exit conduit 44 extends from delivery vessel 40 and provides a discharge path for molten glass from delivery vessel 40. Inlet conduit 50 is coupled to forming body 42 and provides a path for molten glass 28 to enter forming body 42. Drain assembly 100 couples distal end 102 of exit conduit 44 to distal end 104 of inlet conduit 50 and provides a first flow path 106 for molten glass 28 traversing from exit conduit 44 to inlet conduit 50 and forming body 42, and a second flow path 108 different than first flow path 106 that enables draining molten glass from any one or more of delivery vessel 40, exit conduit 44, inlet conduit 50, drain assembly 100, or forming body 42.

Drain assembly 100 comprises a curved conduit section 110 configured to direct the flow of molten glass 28 from a first, downward flow direction 112 to a second flow direction 114 different from first flow direction 112. For example, second flow direction 114 may be orthogonal to first flow direction 112. Drain assembly 100 may further comprise a first transition tube 115 that couples distal end 102 of exit conduit 44 to a first end 116 of curved conduit section 110. Drain assembly 100 may still further comprise a second transition tube 118 that couples second end 120 of curved conduit section 110 to distal end 104 of inlet conduit 50. For example, an inner diameter (ID) 130 of the first end 116 of curved conduit section 110 may be greater than the ID 132 of distal end 102 of exit conduit 44. Similarly, second end 120 of curved conduit section 110 may have a greater ID than the ID of distal end 104 of inlet conduit 50. Accordingly, the IDs of first and second transition tubes 115, 118 may vary along the length of the respective transition tubes to facilitate coupling of attached conduits, e.g., exit conduit 44 and inlet conduit 50, to curved conduit section 110 when the attached conduits having inner diameters that are different than the inner diameter of curved conduit section 110 to which they are coupled. The inner diameter of curved conduit section 110 may be uniform from first end 116 to second end 120. The ID of curved conduit section 110 may be larger than either one or both the ID of exit conduit 44 and inlet conduit 50.

Drain assembly 100 further comprises a drain tube 140 extending between a proximal (inlet) end 142 and a distal (outlet) end 144 thereof, proximal end 142 positioned at and connected to curved conduit section 110 such that inner passage 146 of drain tube 140 is in fluid communication with inner passage 148 of curved conduit section 110. For example, proximal end 142 may be connected to the lowest point of curved conduit section 110, thereby facilitating efficient draining of connected conduits. Drain tube 140 extends in a downward direction from curved conduit section 110, for example in a vertical direction, although sloped directions such as in a range from greater than 0 degrees to 45 degrees relative to vertical, e.g, in a range from greater than 0 degrees from vertical to about 5 degrees from vertical, in a range from greater than 0 degrees from vertical to about 10 degrees from vertical, in a range from greater than 0 degrees from vertical to about 15 degrees from vertical, in a range from greater than 0 degrees from vertical to about 20 degrees from vertical, in a range from greater than 0 degrees from vertical to about 25 degrees from vertical, in a range from greater than 0 degrees from vertical to about 30 degrees from vertical, in a range from greater than 0 degrees from vertical to about 35 degrees from vertical, in a range from greater than 0 degrees from vertical to about 40 degrees from vertical, including all ranges and subranges therebetween, are also contemplated. While illustrated as a straight tube, drain tube 140 may include one or more curved portions or a combination of straight and curved portions. Drain tube 140 should be made a short as possible to avoid unnecessary impedance to fluid flow when the drain tube is operational and molten glass is draining therefrom.

Drain assembly 100 still further comprises a first cooling device 150*a* positioned downstream of curved conduit section 110. For example, first cooling device 150*a* may be positioned adjacent inlet conduit 50. First cooling device 150*a* may comprise, for example, a helical tube that encircles inlet conduit 50 downstream of curved conduit section 110 relative to the direction of molten glass flow. First cooling device 150*a* may be configured to allow a coolant to flow through the cooling device, thereby cooling the adjacent portion of inlet conduit 50. For example, the helical tube may comprise a hollow interior that provides a flow path for coolant to flow through. Suitable coolants may be one or more nonoxidizing gases, e.g., nitrogen, any one or more of the group VIIIA gases (e.g., helium, neon, argon, krypton, xenon), or combinations thereof. However, first cooling device 150*a* may utilize other forms of cooling capable of cooling a portion of inlet conduit 50 about a periphery of the inlet conduit, either alternatively or in addition to a cooling tube configured to convey a coolant therethrough. For example, first cooling device 150*a* may comprise a cooling jacket rather than a cooling tube, or a thermoelectrical cooling device.

As shown in FIG. 2, one or more heating elements 160 may be positioned proximate exit conduit 44, drain assembly 100, and/or inlet conduit 50. Heating elements 160 may be resistive heating elements that generate heat by Joule heating and heat the associated metal component by radiative and/or conductive heating. Heating elements 160 may comprise helical coils wound around the respective conduit, although other physical forms of heating elements may be employed, such as multiple discrete heating elements arranged around a periphery of the respective conduit. In some instances, distal end 144 of drain tube 140 may be heated by a similar heating element 160. However, as illustrated in FIG. 2, in some instances distal end 144 may be heated by a flame provided by a burner 162, e.g., a fuel-air burner.

An optional second cooling device 150*b* may be positioned proximate exit conduit 44. For example, second cooling device 150*b* may be a cooling coil configured to receive a flow of cooling fluid through an interior passage thereof. Second cooling device 150*b* may be used to reduce and or stop flow from exit conduit 44 to forming body 42, until such time that heating of distal end 144 can be completed for example.

Drain assembly 100, including drain tube 140, may be formed from a precious metal, for example a precious metal compatible with the precious metal forming exit conduit 44 and/or inlet conduit 50. Suitable precious metals include platinum group metals selected from the group consisting of platinum, iridium, rhodium, osmium, ruthenium and palladium, or alloys thereof. For example, drain assembly 100 may be formed from a platinum-rhodium alloy including from about 70% to about 90% by weight platinum and about 10% to about 30% by weight rhodium.

Alternatively, or in addition to heating elements 160, electrical flanges 170 may be attached to portions of the downstream glass manufacturing apparatus 30 for heating purposes. For example, FIG. 1 shows electrical flanges 170 attached to exit conduit 44, fining vessel 34, and inlet conduit 50, although electrical flanges 170 may be attached to other metal components of downstream glass manufacturing apparatus 30. Electrical flanges 170 are electrically connected to one or more electrical power supplies (not shown) such that an electrical current can be established in sections of the metal components to which the electrical flanges are attached, for example between adjacent consecutive electrical flanges.

Figure 3:
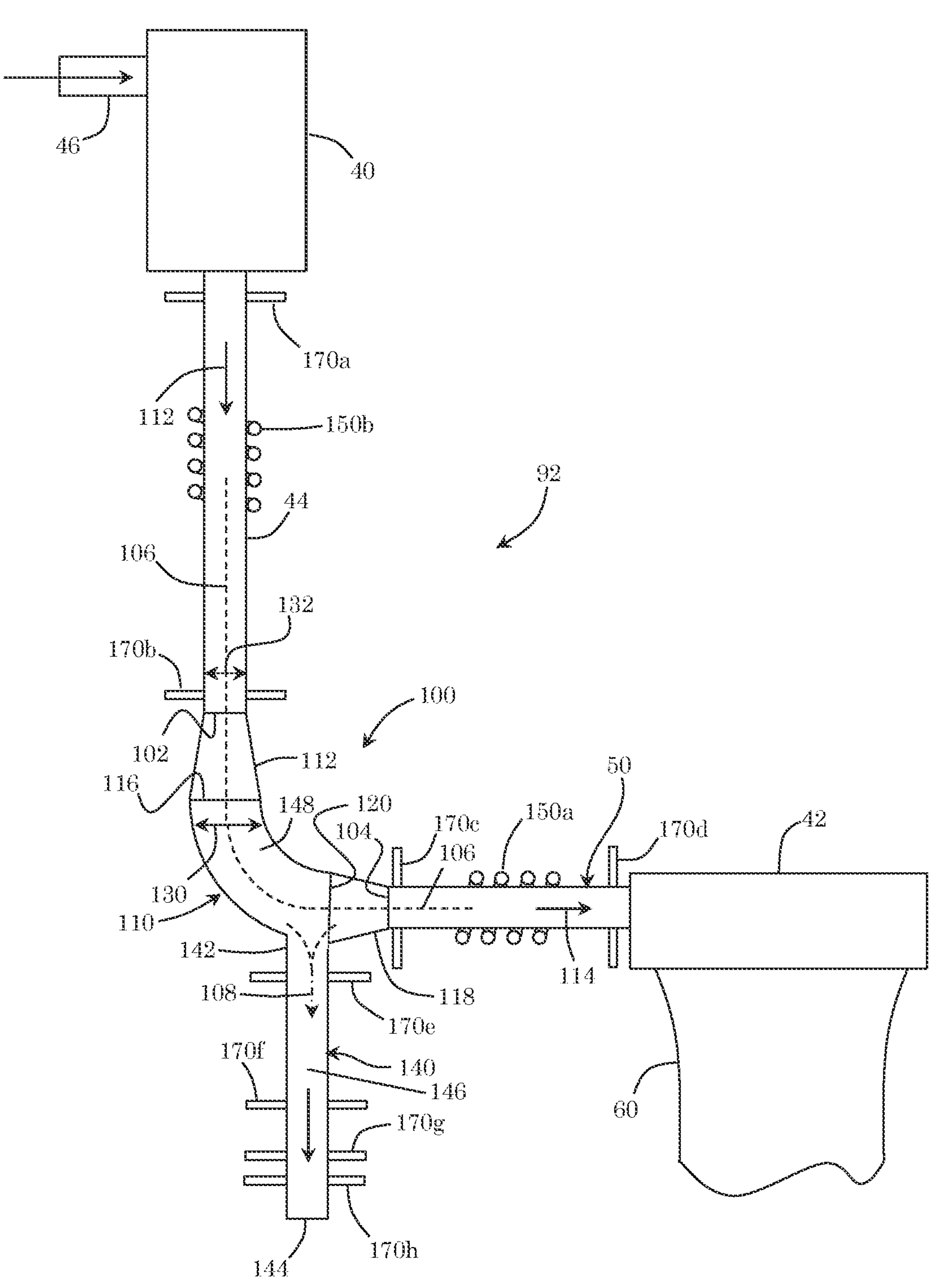
FIG. 3 is a cross-sectional view of a portion of the glass manufacturing apparatus of FIG. 1 comprising another delivery conduit system with a drain assembly configured to drain molten glass from the forming apparatus and adjacent components, the delivery conduit system using electrical flanges and direct heating to heat the molten glass therein.

Accordingly, FIG. 3 depicts a delivery conduit system 92 similar to delivery conduit system 90, except that electrical flanges 170 may be substituted for one or more heating elements 160. More specifically, electrical flanges 170*a* and 170*b* are shown attached to exit conduit 44, electrical flanges 170*c* and 170*d* attached to inlet conduit 50, and electrical flanges 170*e*, 170*f*, 170*g*, and 170*h* attached to drain tube 140. The number and positions of electrical flanges 170 may be provided as necessary. For example, while two electrical flanges are shown attached to exit conduit 44, fewer than two electrical flanges (e.g., one electrical flange), or more than two electrical flanges (e.g., three electrical flanges, four electrical flanges, or five or more electrical flanges) may be attached to exit conduit 44. An electrical current is established in a wall of the metal component between adjacent and consecutive electrical flanges by the one or more electrical power supplies. Thus, for example, a first electrical current can be established between electrical flange 170*a* and electrical flange 170*b*. A second electrical current can be established between electrical flange 170*b* and electrical flange 170*c*. A third electrical current can be established between electrical flanges 170*c* and 170*d*. A fourth electrical current can be established between electrical flanges 170*b* and 170*e*. A fifth electrical current can be established between electrical flanges 170*e* and 170*f*. A sixth electrical current can be established between electrical flanges 170*f* and 170*g*. The various electrical currents heat each respective portion of the metal components between adjacent and consecutive electrical flanges (e.g., exit conduit 44, inlet conduit 50, forming body 42, and drain assembly 100) by Joule heating. The physical arrangement of electrical flanges, and the flow of electrical currents therebetween may be configured according to specific system needs. Thus, the preceding physical arrangement and electrical currents are exemplary and provided as a nonlimiting illustration of a possible configuration. Electrical flanges 170 may comprise a precious metal, for example a precious metal compatible with the precious metal forming exit conduit 44 and/or inlet conduit 50. Suitable precious metals include platinum group metals selected from the group consisting of platinum, iridium, rhodium, osmium, ruthenium and palladium, or alloys thereof. For example, electrical flanges 170 may comprise a platinum-rhodium alloy including from about 70% to about 90% by weight platinum and about 10% to about 30% by weight rhodium. Portions of electrical flanges 170 may comprise nickel. For example, outer portions of the flanges not exposed to high temperature may comprise nickel or a nickel alloy.

As previously described in respect of delivery conduit system 90, delivery conduit system 92 may include first and second cooling devices 150*a* and 150*b*. For example, first and second cooling devices 150*a*, 150*b* may comprise a cooling coil configured to receive a flow of cooling fluid through an interior passage thereof.

The various electrical currents described above (e.g., first through sixth) need not have the same magnitude. Accordingly, different portions of the metal components (e.g., exit conduit 44, inlet conduit 50, forming body 42, and drain assembly 100) may be heated to different temperatures by controlling the individual electrical currents between pairs of electrical flanges as the need arises. Electrical flanges 170*f* and 170*g* may be closely spaced, thereby allowing a short length of drain tube 140 near distal end 144 of the drain tube 140 to be selectively heated.

Figure 4:
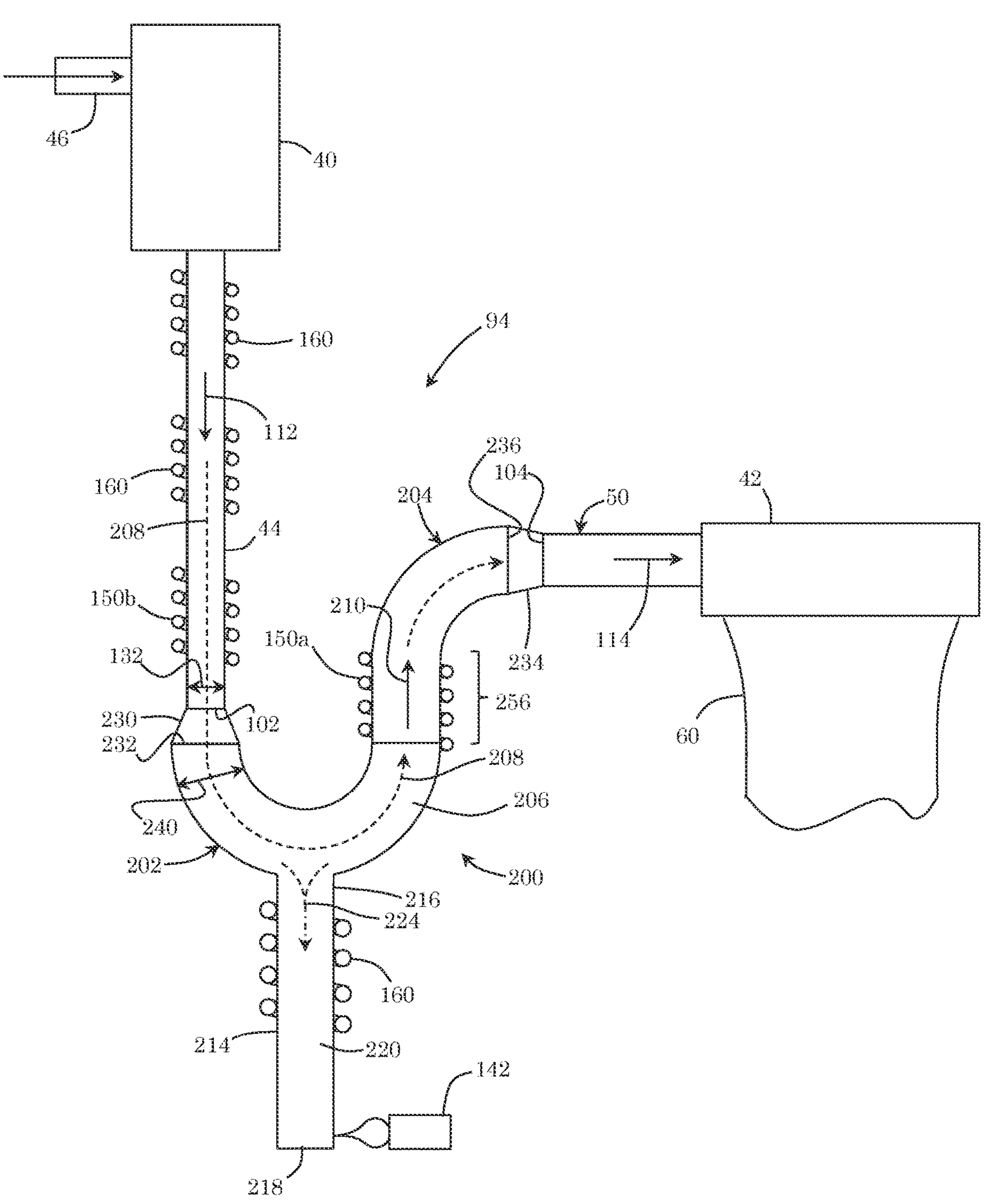
FIG. 4 is a cross-sectional view of a portion of the glass manufacturing apparatus of FIG. 1 comprising still another exemplary delivery conduit system with a drain assembly configured to drain molten glass from the forming apparatus and adjacent components, the drain assembly using radiant heaters to heat the molten glass therein.

FIG. 4 depicts another delivery conduit system 94 similar to delivery conduit system 90 but comprising a drain assembly 200 including a first curved conduit section 202, and a second curved conduit section 204 disposed downstream of first curved conduit section 202 relative to the flow of molten glass. First curved conduit section 202 may be a U-shaped conduit section defining an interior passage 206 for the flow of molten glass 28 along a first flow path 208. Thus, the downward first flow direction 112 of molten glass 28 from exit conduit 44 may be redirected by first curved conduit section 202 to an upward second flow direction 114 (at the exit of first curved conduit section 202) of molten glass in flow direction 210. For example, first curved conduit section 202 may extend through a 180-degree curvature such that flow direction 210 is opposite first flow direction 112, although other curvatures are contemplated and may be provided as needed. Second curved conduit section 204 is coupled to first curved conduit section 202. The flow of molten glass exiting first curved conduit section 202 is further directed by second curved conduit section 204 to a lateral flow of molten glass along second flow direction 114. Second flow direction 114 may be orthogonal to first flow direction 112 in inlet conduit 50 and/or flow direction 210. For example, either one or both of first curved conduit section 202 or second curved conduit section 204 may include a 90-degree elbow conduit. Second curved conduit section 204 is coupled to distal end 104 of inlet conduit 50, wherein the flow of molten glass is provided to forming body 42 from inlet conduit 50.

Drain assembly 200 further comprises a drain tube 214 extending downward between a proximal end 216 and a distal end 218, proximal end 216 connected to first curved conduit section 202 such that interior passage 220 of drain tube 214 is in fluid communication with interior passage 206 of first curved conduit section 202. While drain tube 214 is depicted as a vertically extending tube, sloped directions such as in a range from greater than 0 degrees from vertical to 45 degrees from vertical, e.g., in a range from greater than 0 degrees from vertical to about 5 degrees from vertical, in a range from greater than 0 degrees from vertical to about 10 degrees from vertical, in a range from greater than 0 degrees from vertical to about 15 degrees from vertical, in a range from greater than 0 degrees from vertical to about 20 degrees from vertical, in a range from greater than 0 degrees from vertical to about 25 degrees from vertical, in a range from greater than 0 degrees from vertical to about 30 degrees from vertical, in a range from greater than 0 degrees from vertical to about 35 degrees from vertical, in a range from greater than 0 degrees from vertical to about 40 degrees from vertical, including all ranges and subranges therebetween, are also contemplated. While illustrated as a straight tube, drain tube 214 need not be straight, but may include one or more curved portions. Drain tube 214 defines a second flow path 224 along which molten glass may be drained from any one or more of delivery vessel 40, exit conduit 44, drain assembly 200, forming body 42, and/or inlet conduit 50.

Drain assembly 200 may further comprise a first transition tube 230 that couples distal end 102 of exit conduit 44 to a first end 232 of first curved conduit section 202. Drain assembly 200 may still further comprise a second transition tube 234 that couples second end 236 of first curved conduit section 202 to distal end 104 of inlet conduit 50. For example, as shown in FIG. 4, an inner diameter (ID) 240 of the first end 232 of first curved conduit section 202 may be greater than the ID 132 of distal end 102 of exit conduit 44. Similarly, second end 236 of second curved conduit section 204 may have a greater ID than the ID of distal end 104 of inlet conduit 50. Accordingly, the IDs of first and second transition tubes 230 and 234 may vary along the length of the respective transition tubes to facilitate coupling of attached conduits, e.g., exit conduit 44 and inlet conduit 50, to the respective first curved conduit section 202 or second curved conduit section 204 when the attached conduits have inner diameters that are different than the inner diameters of first curved conduit section 202 or second curved conduit section 204. The inner diameter of first curved conduit section 202 may be uniform along the length of the first curved conduit section. Similarly, the inner diameter of second curved conduit section 204 may be uniform along the length of the second curved conduit section. The ID of first curved conduit section 202 and/or second curved conduit section 204 may be larger than either one or both the ID of exit conduit 44 and the ID of inlet conduit 50.

Delivery conduit system 94 comprises first cooling device 150*a* positioned downstream of first curved conduit section 202 relative to the direction of flow of molten glass. As described for previous embodiments, first cooling device 150*a* may comprise a helical tube positioned between first curved conduit portion 202 and second curved conduit section 204, first cooling device 150*a* configured to allow a coolant to flow through the helical tube, thereby cooling the molten glass conveyed therethrough. For example, the helical tube may comprise a hollow interior that provides a flow path for coolant. Suitable coolants may be one or more nonoxidizing gases (e.g., nitrogen, noble gases, or combinations thereof) or a liquid (water). However, first cooling device 150*a* may take other forms capable of cooling a portion of delivery conduit system 94. For example, first cooling device 150*a* may comprise a cooling jacket or a thermoelectrical cooling device.

As shown in FIG. 4 and similar to the embodiment of FIG. 2, one or more heating elements 160 may be positioned proximate exit conduit 44, drain assembly 200, inlet conduit 50, and/or drain tube 214. As previously described, heating elements 160 may be resistive heating elements that generate heat by Joule heating and heat the adjacent metal component by radiative and/or conductive heating. In some instances, distal end 218 of drain tube 214 may be heated by a similar heating element 160. In some instances, distal end 218 may be heated by a flame provided by burner 162, e.g., a fuel-air burner.

As previously described in respect of delivery conduit system 90, delivery conduit system 94 may optionally include second cooling device 150*b* positioned proximate exit conduit 44, second cooling device 150*b* configured to reduce or eliminate flow from exit conduit 44. For example, when second cooling device 150*b* is activated, such as by commencing a flow of coolant therethrough, the viscosity of molten glass in exit conduit 44 adjacent second cooling device 150*b* can be increased, thereby forming a plug of glass in the exit conduit.

Figure 5:
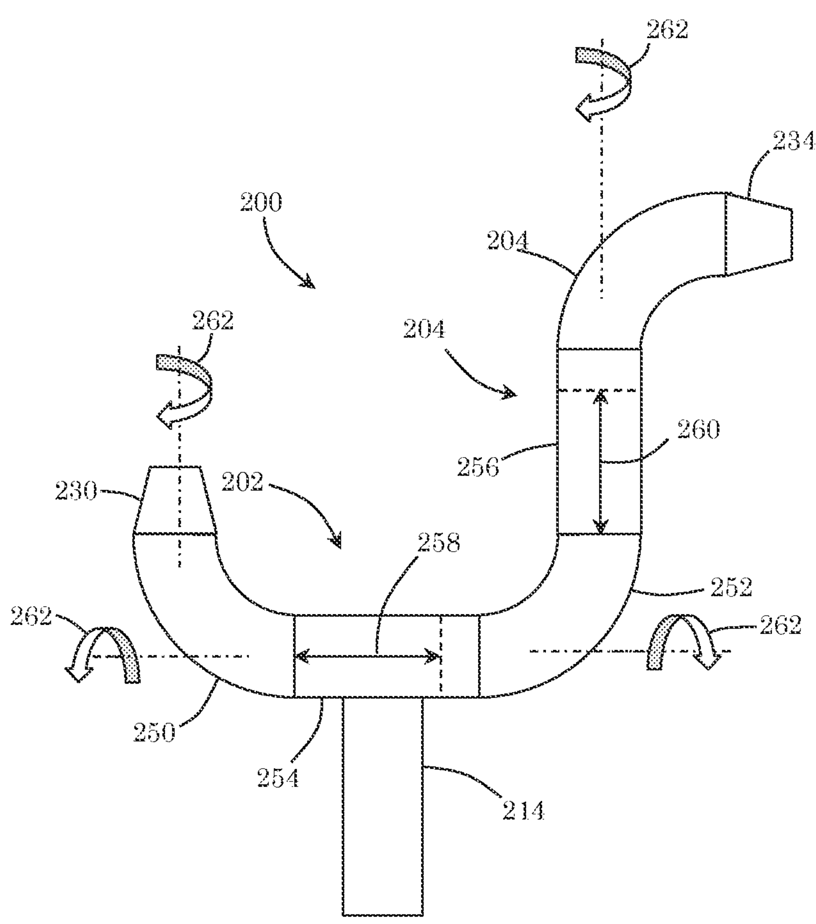
FIG. 5 is a cross-sectional view of the drain assembly of FIG. 4 showing various degrees of freedom (e.g., rotation and length) for assembly of the drain assembly.

Referring to FIG. 5, drain assembly 200 may include one or more straight conduit portions. For example, first curved conduit section 202 may comprise a first curved conduit portion 250 and a second curved conduit portion 252, wherein a first straight conduit portion 254 may be coupled between first curved conduit portion 250 and second curved conduit portion 252. Similarly, a second straight conduit portion 256 may be coupled between second curved conduit portion 252 and second curved conduit section 204. The arrangement of curved and straight lengths of conduit shown in FIG. 5 allow for more versatile configuration of the drain assembly than if only curved lengths are used. For example, as illustrated in FIG. 5, the length 258 of first straight conduit portion 254 can be increased or decreased as necessary to accommodate a predetermined horizontal separation between delivery vessel 40 (e.g., exit conduit 44) and forming body 42 (e.g., inlet conduit 50). Similarly, the length 260 of second straight conduit portion 256 may be increased or decreased as necessary to accommodate a predetermined vertical separation between delivery vessel 40 and forming body 42 (e.g., inlet conduit 50). Moreover, the angular orientation between the various curved and straight portions of the drain assembly conduits (indicated by curved arrows 262 and their respective axes in FIG. 5), as well as their lengths, may be arranged as needed, thereby providing multiple degrees of freedom of movement and allowing the drain assembly to facilitate a large number of mechanical arrangements of delivery vessel 40 and forming body 42 relative to each other. In particular, second straight conduit portion 256 may be utilized as a convenient location at which to position first cooling device 150*a*. For example, first cooling device 150*a* may be positioned proximate second straight conduit portion 256. Such an arrangement is shown in FIG. 4, for example, wherein first cooling device 150*a* is depicted as a helical tube wound about straight conduit portion 256 coupled between first curved conduit section 202 and second curved conduit section 204. However, first cooling device 150*a* may be positioned proximate other portions of delivery conduit system 92, or at inlet conduit 50. In the embodiment of FIG. 5, drain tube 214 is shown connected to and descending from first straight conduit portion 254 disposed between first curved conduit portion 250 and second curved conduit portion 252.

Electrical flanges 170 may be attached to portions of the downstream glass manufacturing apparatus and configured to establish an electrical current in the portions of the downstream glass manufacturing apparatus. The various electrical flanges shown in FIG. 3 are equally suitable for the embodiment depicted in FIG. 4, including the distribution of electrical currents capable of heating sections of the metal components between adjacent electrical flanges to the same or different temperatures.

Figure 6:
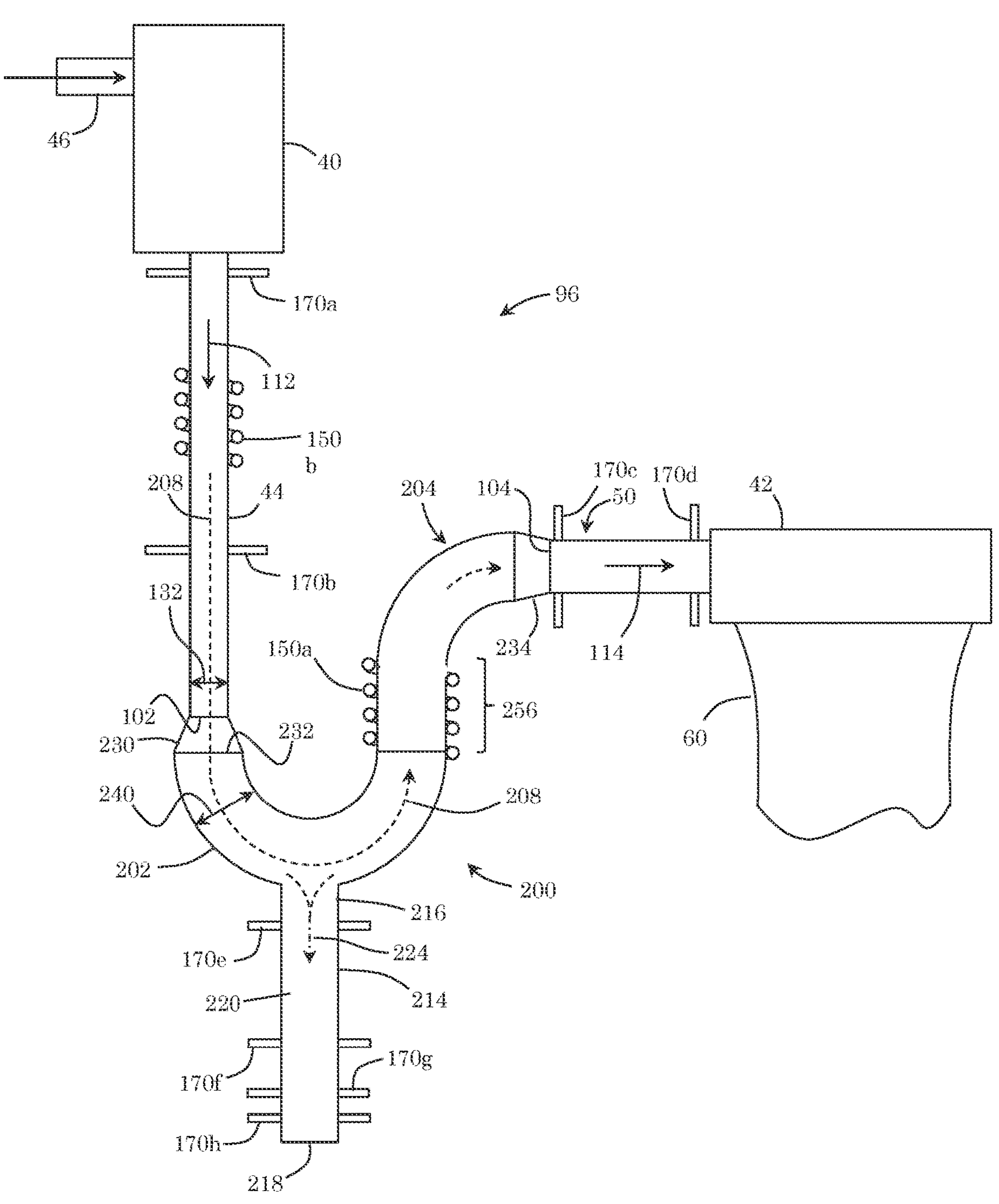
FIG. 6 is a cross-sectional view of a portion of the glass manufacturing apparatus of FIG. 1 comprising still another exemplary delivery conduit system with a drain assembly configured to drain molten glass from the forming apparatus and adjacent components, the drain assembly using electrical flanges and direct heating to heat the molten glass therein.

Accordingly, FIG. 6 depicts another delivery conduit system 96 comprising drain assembly 200 similar to delivery conduit system 94 except that delivery conduit system 96 comprises electrical flanges 170 substituted for one or more heating elements 150. For example, FIG. 6 illustrates electrical flanges 170 attached to exit conduit 44, fining vessel 34, and inlet conduit 50, although electrical flanges 170 may be attached to other metal components of downstream glass manufacturing apparatus 30. Electrical flanges 170 are electrically connected to one or more electrical power supplies (not shown) such that an electrical current can be established in sections of the metal components to which the electrical flanges are attached. More specifically, FIG. 6 depicts electrical flanges 170*a* and 170*b* attached to exit conduit 44, electrical flanges 170*c* and 170*d* attached to inlet conduit 50, and electrical flanges 170*e*, 170*f*, 170*g*, and 170*h* attached to drain tube 314. The number and positions of electrical flanges 170 may be provided as necessary. For example, while two electrical flanges are shown attached to exit conduit 44, fewer than two electrical flanges (e.g., one electrical flange), or more than two electrical flanges (e.g., three electrical flanges, four electrical flanges, or five or more electrical flanges) may be attached to exit conduit 44. An electrical current is established in a wall of the metal component between adjacent electrical flanges by the one or more electrical power supplies. Thus, for example, a first electrical current can be established between electrical flange 170*a* and electrical flange 170*b*. A second electrical current can be established between electrical flange 170*b* and electrical flange 170*c*. A third electrical current can be established between electrical flanges 170*c* and 170*d*. A fourth electrical current can be established between electrical flanges 170*b* and 170*e*. A fifth electrical current can be established between electrical flanges 170*e* and 170*f*. A sixth electrical current can be established between electrical flanges 170*f* and 170*g*. The various electrical currents heat each respective portion of the metal components between adjacent electrical flanges (e.g., exit conduit 44, inlet conduit 50, forming body 42, and drain assembly 200) by Joule heating.

The various electrical currents (e.g., first through sixth) need not have the same magnitude. Accordingly, different portions of the metal components (e.g., exit conduit 44, inlet conduit 50, forming body 42, and drain assembly 200) may be heated to different temperatures by controlling the individual electrical currents between pairs of electrical flanges as the need arises. Electrical flanges 170*f* and 170*g* are closely spaced, thereby allowing a short length of drain tube 314 near distal end 318 of the drain tube to be selectively heated.

In addition to curved conduit sections described in respect of delivery conduit system 92, delivery conduit system 96 may include straight conduit portions as illustrated in FIG. 5.

Figure 7:
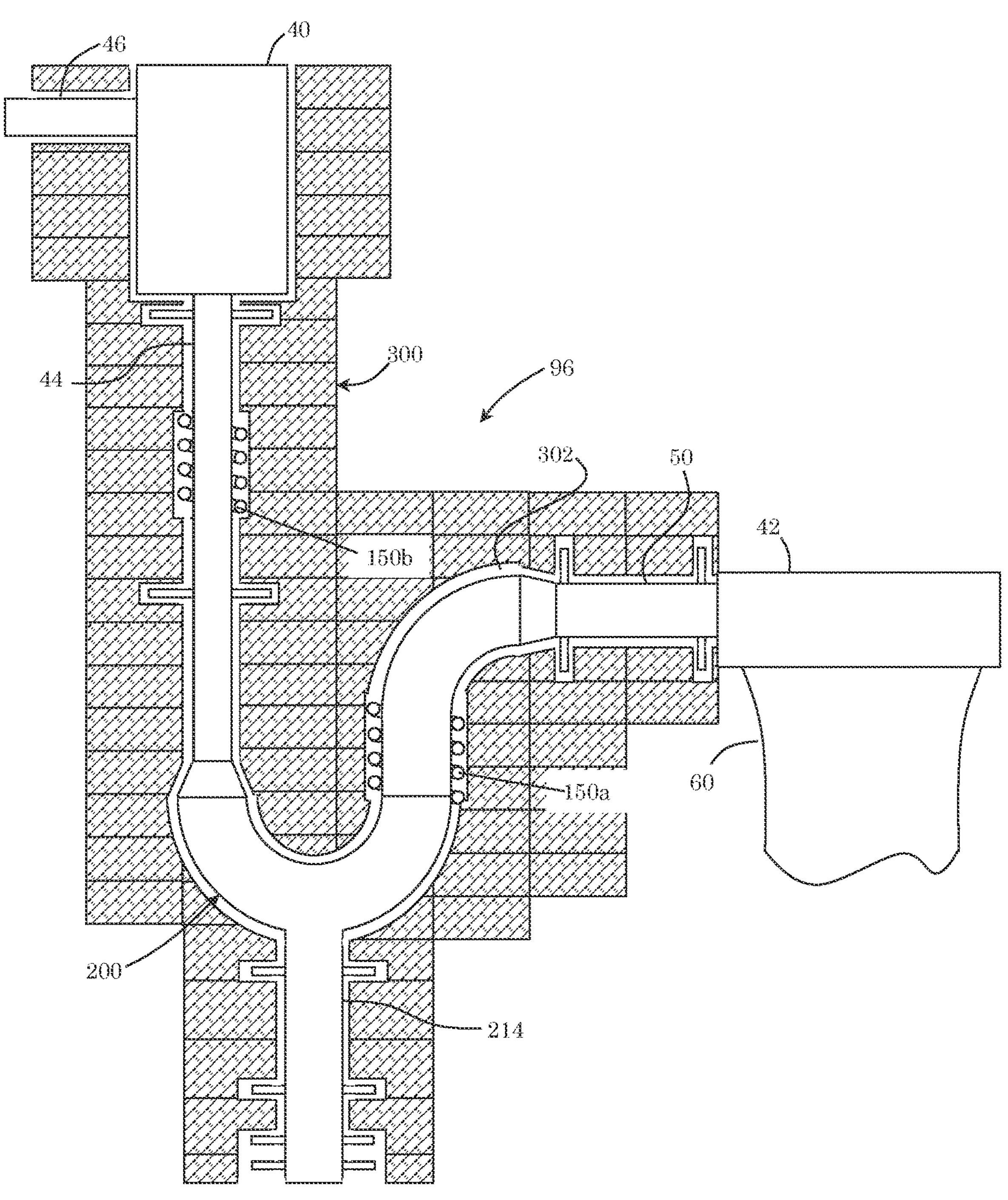
FIG. 7 is a cross-sectional view of a portion of the glass manufacturing apparatus of FIG. 1 comprising the delivery conduit system of FIG. 6 and showing refractory thermal insulating material disposed about the delivery conduit system.

In addition to the foregoing aspect, any one of the embodiments described herein may be surrounded by one or more layers of refractory insulating material selected to control heat loss from the delivery conduit system. For example, FIG. 7 illustrates the delivery conduit system depicted in FIG. 6 encased within layers of a refractory insulating material 300. The refractory insulating material may be selected from mullite, an insulating fire brick, Duraboard manufactured by the Johns Manville company (e.g., Duraboard 3000), or other refractory thermal insulating materials having a range of thermal conductivities. The thermal conductivities of the refractory insulating materials may be selected as needed to control portions of the delivery conduit system to predetermined temperatures depending on the desired viscosity of the molten glass therein. Additionally, the refractory insulating material surrounding the delivery conduit system, and in particular the drain assembly, should be configured to allow free movement (e.g., expansion) of the delivery conduit system as the system is heated. The refractory insulating material 300 should allow the delivery conduit system to expand radially, horizontally, and vertically as the delivery conduit system moves during thermal expansion. Accordingly, the refractory insulating material can be separated from all or some of the delivery conduit system, for example the drain assembly, by a gap 302. To that end, anchors extending from the delivery conduit system that might bind and support the delivery conduit system within the refractory insulating material may be omitted.

During normal operation, delivery vessel 40 delivers molten glass 28 to forming body 42 via the delivery conduit system. Forming body 42 may comprise, for example, a slot draw apparatus comprising a vessel that receives the molten glass from the delivery conduit system. The molten glass exits the vessel via a slot arranged on an underside of the vessel, the molten glass forming a glass ribbon that is drawn downward by pulling rolls and gravity. The delivery conduit system and the slot present a predetermined fluid impedance to the flow of molten glass. In particular, the slot may represent the largest single source of fluid impedance during normal operation and may dictate the magnitude of molten glass flow achievable for a predetermined molten glass viscosity.

In may become necessary during a glass forming operation to halt the forming process. For example, it may become necessary to repair or replace certain glass manufacturing equipment, such as glass manufacturing equipment downstream of the forming body or the forming body itself. In such circumstances, the drain tube can be opened. Under normal operating conditions, the drain tube is closed by reducing heating of the drain tube and allowing the drain tube to reach a temperature below the softening temperature of the molten glass. This can be done by reducing the power provided to external resistance heaters adjacent the drain tube, reducing the electrical current through electrical flanges (and the drain tube) positioned at or near the distal end of the drain tube, or not applying a flame to the distal end from a burner, depending on the arrangement of the heating device or devices. Any one of these actions can result in freezing of the material in the drain tube such that a viscosity of the material in the drain tube is sufficiently lowered that it forms a plug that plugs the drain tube such that molten glass does not flow from the distal (i.e., outlet) end of the drain tube.

In the event molten glass is to be drained from the delivery conduit system, the drain tube can be opened by increasing the electrical power to the heating elements (e.g., resistance heaters), thereby increasing heat output from the heating elements, increasing the magnitude of electrical current to the electrical flanges at the distal end of the drain tube, or applying a flame from a burner, depending on the configuration of the heating device or devices, thereby allowing the previously-formed plug to melt and molten glass to flow through and from the drain tube. Thus, the drain tube provides a preferential flow path for the molten glass when the drain tube is opened by decreasing the total impedance of the drain flow path. This can be accomplished, for example, by ensuring the ID of the drain assembly, including the drain tube, is greater than the ID of the connected conduits, e.g., exit conduit of the delivery vessel and/or inlet conduit of the forming body.

This continued flow of molten glass to the forming body may interfere with downstream repairs and/or may result in damage to the forming body wherein the molten glass dams up via insufficient flow and must be hammered out prior to restarting the forming process. In any event, it may be necessary to cease entirely molten glass flow to the forming body. Accordingly, first cooling device 150*a* can be activated, for example by starting a flow of coolant through the cooling device (e.g., cooling tube), thereby freezing molten glass within a portion of the delivery conduit system downstream of the drain tube and forming a glass plug therein. The resultant glass plug prevents further flow to the forming body.

In some instances it may be necessary to reduce or eliminate flow to forming body 42 faster than can be accommodated by the heating of drain tube 140 to open the drain tube (increase the viscosity of the glass plug blocking the drain tube so flow of molten glass can be commenced through the drain tube). In instances where optional second cooling device 150*b* is installed, second cooling device 150*b* can be activated, thereby reducing, or eliminating the flow of molten glass from exit conduit 44. When drain tube 140 is opened, second cooling device 150*b* may be deactivated if needed, for example to drain delivery vessel 40.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A glass manufacturing apparatus, comprising:

a delivery conduit system configured to convey a flow of molten glass from a delivery vessel to a forming body, the delivery conduit system comprising:

an exit conduit extending from the delivery vessel;

an inlet conduit extending from the forming body;

a drain assembly coupled between the exit conduit and the inlet conduit, the drain assembly comprising a downward-extending drain tube comprising an inlet end and an outlet end, and comprising a first curved conduit section configured to direct the flow of molten glass from a first direction to a second direction different from the first direction;

a first cooling device disposed adjacent the delivery conduit system between the drain tube and the forming body; and a heating device configured to heat the outlet end of the drain tube, wherein the first curved conduit section comprises a first curved conduit portion and a second curved conduit portion, each of the first curved conduit portion and the second curved conduit portion configured to direct the flow of molten glass through a change in direction of 90 degrees, wherein the first curved conduit section comprises a first straight conduit portion coupled between the first curved conduit portion and the second curved conduit portion, and wherein the drain assembly further comprises a second curved conduit section connected to the first curved conduit section and disposed between the first curved conduit section and the inlet conduit.

2. The glass manufacturing apparatus of claim 1, wherein the heating device comprises a pair of electrical flanges attached to the drain tube.

3. The glass manufacturing apparatus of claim 1, wherein the drain tube is coupled to the first straight conduit portion.

4. The glass manufacturing apparatus of claim 1, wherein a second straight conduit portion is coupled between the second curved conduit portion and the second curved conduit section.

5. The glass manufacturing apparatus of claim 4, wherein the cooling device is positioned proximate the second straight conduit portion.

6. The glass manufacturing apparatus of claim 1, wherein the delivery conduit system comprises platinum.

7. The glass manufacturing apparatus of claim 1, wherein an inside diameter of the exit conduit is less than an inside diameter of the first curved conduit section.

8. The glass manufacturing apparatus of claim 7, wherein a first transition tube is coupled between the exit conduit and the first curved conduit section, an inside diameter of the first transition tube varying between the inside diameter of the exit conduit and the inside diameter of the first curved conduit section.

9. The glass manufacturing apparatus of claim 7, wherein a second transition tube is coupled between the inlet conduit and the second curved conduit section, an inside diameter of the second transition tube varying between the inside diameter of the inlet conduit and the inside diameter of the second curved conduit section.

10. The glass manufacturing apparatus of claim 1, wherein the second curved conduit section is coupled to the inlet conduit and an inside diameter of the inlet conduit is less than an inside diameter of the second curved conduit section.

11. A glass manufacturing apparatus, comprising:

a delivery vessel, a forming body, and a delivery conduit system configured to convey a flow of molten glass from the delivery vessel toward the forming body, the delivery conduit system comprising:

an exit conduit extending downward from the delivery vessel;

an inlet conduit extending from the forming body;

a drain assembly coupled between the exit conduit and the inlet conduit, the drain assembly comprising a first curved conduit section and a second curved conduit section disposed downstream of the first curved conduit section relative to a flow direction of the molten glass;

a drain tube extending downward from the drain assembly, the drain tube comprising a proximal end attached to the drain assembly and a distal end opposite the proximal end;

a first cooling device disposed downstream from the first curved conduit section and configured to cool the at least a portion of the delivery conduit system downstream from the first curved conduit section; and a heating device configured to heat the distal end of the drain tube, wherein the first curved conduit section is configured to direct the flow of molten glass from a first direction to a second direction opposite the first direction, and wherein the second curved conduit section is configured to direct the flow of molten glass from the second direction to a third direction intermediate the first direction and the second direction.

12. The glass manufacturing apparatus of claim 11, wherein an inside diameter of the exit conduit is less than an inside diameter of the first curved conduit section.

13. The glass manufacturing apparatus of claim 11, wherein an inside diameter of the inlet conduit is less than an inside diameter of the second curved conduit section.

14. The glass manufacturing apparatus of claim 11, wherein the first curved conduit section comprises a first curved conduit portion and a second curved conduit portion, each of the first curved conduit portion and the second curved conduit portion extending through an angle of 90 degrees.

15. The glass manufacturing apparatus of claim 11, wherein the first curved conduit section comprises a first curved conduit portion, a second curved conduit portion, and a first straight conduit portion disposed between the first curved conduit portion and the second curved conduit portion.

16. The glass manufacturing apparatus of claim 11, further comprising a second straight conduit portion coupled between the first curved conduit section and the second curved conduit section.

* * * * *